No. 843,207. PATENTED FEB. 5, 1907.
G. W. HAYDEN.
STEAM TRAP.
APPLICATION FILED AUG. 2, 1905.
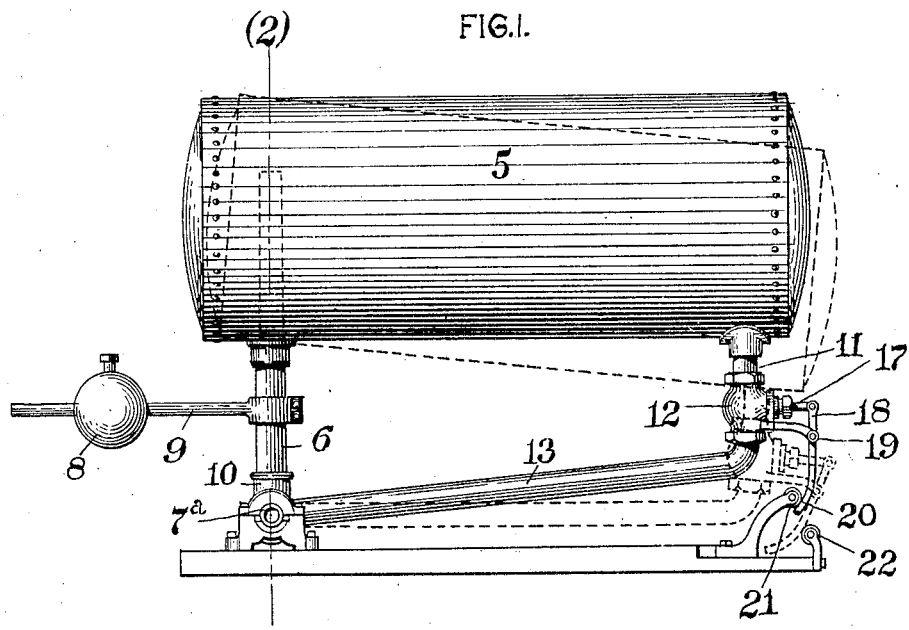
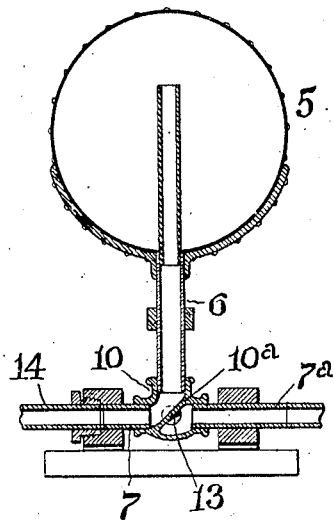
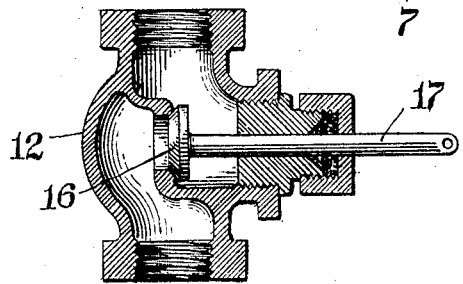
Witnesses: F. E. Gaither. Archworth Martin.
Inventor: George W. Hayden

UNITED STATES PATENT OFFICE.

GEORGE W. HAYDEN, OF CHICAGO, ILLINOIS, ASSIGNOR TO CRANE COMPANY, OF CHICAGO, ILLINOIS, A CORPORATION OF ILLINOIS.

STEAM-TRAP.

No. 843,207. Specification of Letters Patent. Patented Feb. 5, 1907.

Application filed August 2, 1905. Serial No. 272,365.

*To all whom it may concern:*

Be it known that I, GEORGE W. HAYDEN, a citizen of the United States, residing at Chicago, county of Cook, in the State of Illinois, have invented certain new and useful Improvements in Tilting Steam-Traps, of which the following is a specification.

My invention relates to traps for relieving steam pipes and the like of condensed water collected therein, and particularly to intermittently discharging tilting traps. The objects of the invention are, to render more accurate and certain the operation of steam traps in which a reservoir for collecting water is automatically tilted when it becomes full, to discharge the water; to provide superior operating means for the water outlet valve; to provide adjustments for the throw of the valve, and to generally simplify and improve the structure of tilting steam traps. These objects and other advantages which will hereinafter appear I attain by means of the construction illustrated in preferred form in the accompanying drawing, wherein—

Figure 1 is a side elevation of the device with the steam trap empty, and showing in dotted lines the tilting movement:

Figure 2 is a vertical cross section on line (2) in Figure 1, and

Figure 3 is a central vertical section of the outlet valve.

The collecting reservoir or trap 5 is pivotally mounted on an upright hollow post 6 which is mounted to rock upon a hollow trunnion formed by the pipe 7 and is counterbalanced by means of a weight 8 supported and adjustable in position upon a rod 9 clamped upon the upright post 6. The entrance for steam to the reservoir 5 is through the hollow trunnion 7, the half of the T 10 and the holllow post 6, discharging at the top of the trap as shown. When the trap is filled with water sufficiently to overbalance the weight 8 and tilt, discharge of the water is effected through the pipe 11 and valve 12, and a return pipe 13 which is preferably inclined for complete drainage and empties into the other side of the T 10 and out through pipe 7ª in Figure 2. Any desired means may be used for connecting the rotating trunnion pipe 7 with the stationary part 14 of the piping, and such being well known need not be here described.

The water discharge pipe 11 has the valve casing 12 supplied with a direct seating valve 16 whose stem 17 projects in a horizontal direction and is pivoted to a lever 18 supported upon a bracket 19 fixed to the valve casing and having an inwardly bent lower curved end 20 arranged to coöperate with a pair of rollers 21 and 22 when in raised or lowered positions, respectively. It will be seen that when the reservoir 5 is in the position shown in full lines in Figure 1, the lower end 20 of the lever has engaged the roller 21 and has therefore caused the valve 16 to close; but when the trap tilts downwardly the sloping end 20 will strike the roller 22 at the desired time according to adjustment, and thrust outward the valve stem 17 and open the valve for escape of the water. Of course these parts may be so arranged that the valve will close or open at any desired time by changing the position of the rollers; or the position of the inclination of the lever and the rapidity with which it closes or opens may be regulated by varying the slant of the bent end 20 of the lever 18.

The T 10 is provided with the partition 10ª arranged as shown in Figure 2 so as to provide communication between pipes 6 and 7 for the steam and between pipes 7ª and 13 for the water while separating the steam and water passages.

By the construction and operation described the steam trap is much simplified and the valve is automatically operated and is regulable at will and the operative parts are in sight where it can be observed whether they are in working order. All the parts may be adjusted to secure such action as may be desired. Other advantages of the device will readily occur to those familiar with the art.

Having thus described my invention and illustrated its use, what I claim as new, and desire to secure by Letters Patent, is the following:

1. In combination in a steam trap a reservoir pivotally mounted upon a hollow trunnion, a steam inlet through said trunnion communicating with the reservoir, an outlet pipe and a valve therein, a lever pivoted to the stem of the valve and having an inclined end, and rollers arranged to strike said inclined end to open and close the valve as the lever is moved up or down with the moving reservoir, substantially as described.

2. In a tilting trap, an outlet valve therefor having an extended stem, a lever 18 pivoted on the valve casing and to said stem and having an inclined end 20, and a pair of rollers engaging said inclined portion respectively in a lowered or raised position as the reservoir tilts, whereby to open and close the steam valve when the reservoir is at its lower or upper position respectively, substantially as described.

3. In combination in a steam trap a reservoir pivotally mounted upon a hollow trunnion, a steam inlet to such trunnion leading from the reservoir, an outlet pipe provided with a valve a lever pivoted to the stem of the valve and having an inclined end, and camming means arranged to engage said inclined end for opening the valve as the lever is moved downward with the moving reservoir.

4. In a steam trap the combination with a reservoir pivotally mounted upon a hollow trunnion, a steam inlet to such trunnion leading from the reservoir, an outlet pipe provided with a valve, a lever pivoted to the stem of the valve and having an engaging end, and camming means arranged to engage said engaging end for opening the valve as the lever is moved downward with the moving reservoir.

In testimony whereof I have hereunto signed my name in the presence of the two subscribed witnesses.

GEORGE W. HAYDEN.

Witnesses:
PAUL CARPENTER,
ALBERT GRANT MILLER.